US008592494B2

(12) United States Patent
Matsumura et al.

(10) Patent No.: US 8,592,494 B2
(45) Date of Patent: *Nov. 26, 2013

(54) STYRENE-MODIFIED LINEAR LOW-DENSITY POLYETHYLENE-BASED RESIN BEADS, STYRENE-MODIFIED LINEAR LOW-DENSITY POLYETHYLENE-BASED EXPANDABLE RESIN BEADS, PRODUCTION METHOD THEREFOR, PRE-EXPANDED BEADS AND EXPANDED MOLDED ARTICLE

(75) Inventors: Hideyasu Matsumura, Shiga (JP); Tatsuya Matsugashita, Nara (JP)

(73) Assignee: Sekisui Plastics Co., Ltd., Osaka (JP)

( * ) Notice: Subject to any disclaimer, the term of this patent is extended or adjusted under 35 U.S.C. 154(b) by 92 days.

This patent is subject to a terminal disclaimer.

(21) Appl. No.: 13/230,568

(22) Filed: Sep. 12, 2011

(65) Prior Publication Data

US 2012/0004337 A1 Jan. 5, 2012

Related U.S. Application Data

(63) Continuation of application No. 11/659,466, filed as application No. PCT/JP2005/015152 on Aug. 19, 2005, now abandoned.

(30) Foreign Application Priority Data

Sep. 6, 2004 (JP) ................. 2004-258792

(51) Int. Cl.
*C08J 9/16* (2006.01)
*C08J 9/18* (2006.01)
*B22C 1/22* (2006.01)

(52) U.S. Cl.
USPC ................ 521/59; 521/56; 521/60; 521/139; 428/304.4

(58) Field of Classification Search
USPC ............................ 521/56, 59, 60
See application file for complete search history.

(56) References Cited

U.S. PATENT DOCUMENTS

| | | | | |
|---|---|---|---|---|
| 4,168,353 | A * | 9/1979 | Kitamori ................ | 521/59 |
| 6,231,795 | B1 * | 5/2001 | Chaudhary et al. ........... | 264/53 |
| 7,579,384 | B2 * | 8/2009 | Matsumura et al. ........... | 521/56 |
| 7,767,723 | B2 * | 8/2010 | Matsumura et al. ........... | 521/56 |
| 7,767,724 | B2 | 8/2010 | Matsumura | |
| 2002/0037979 | A1 * | 3/2002 | Job et al. ................ | 526/119 |
| 2003/0212156 | A1 * | 11/2003 | Kunimi et al. ............. | 521/56 |
| 2006/0058406 | A1 | 3/2006 | Matsumura et al. | |
| 2006/0063847 | A1 | 3/2006 | Matsumura et al. | |

FOREIGN PATENT DOCUMENTS

| | | |
|---|---|---|
| JP | 51046138 | 12/1976 |
| JP | 52010150 | 3/1977 |
| JP | 58053003 | 11/1983 |
| JP | 62059642 | 3/1987 |
| JP | 01284536 | * 11/1989 |
| JP | 2284905 | 11/1990 |
| JP | 03273014 | 12/1991 |
| JP | 04183706 | 6/1992 |
| JP | 08059754 | 3/1996 |
| JP | 2668384 | 7/1997 |
| JP | 2005097555 | 4/2005 |
| JP | 2005281595 | 10/2005 |
| WO | 2004/085527 | 10/2004 |
| WO | WO 2004085528 | * 10/2004 |

OTHER PUBLICATIONS

Sherman, LL.M. "Polyolefins Get Tough With Metallocenes", Plastics Technology, 1996.*
Affinity PL 1840G flyer, 2005.*
Affinity PL 1880 flyer, 2005.*
English Language Abstract of JP 8-059754, 1996.
English Language Abstract of JP 4-183706, 1992.
English Language Abstract of JP 3-273014, 1991.
English Language Abstract of JP 2-284905, 1990.
English Language Abstract of JP 2005-281595, 2005.
English Language Abstract of JP 2005-097555, 2005.
English Language Abstract of JP 58-053003, 1983.
English Language Abstract of JP 62-059642, 1987.
English Language Abstract of JP 1-284536, 1989.
U.S. Appl. No. 11/659,469 (Matsumura et al.), filed Feb. 6, 2007 and entitled, "Styrene-Modified Polyethylene-Resin Beads, Styrene-Modified Polyethylene-Based Expandable Resin Beads, Production Method therefore, Pre-Expanded Beads and Expanded Molded Article".
U.S. Appl. No. 11/659,463 (Matsumura et al.), filed Feb. 6, 2007 and entitled, "Expanded Molded Article Having Voids".

* cited by examiner

*Primary Examiner* — Irina Krylova
(74) *Attorney, Agent, or Firm* — Greenblum & Bernstein, P.L.C.

(57) ABSTRACT

A method for producing styrene-modified linear low-density polyethylene-based resin particles, which includes the steps of: dispersing 100 parts by weight of non-crosslinked linear low-density polyethylene-based resin particles which are polymerized using a metallocene compound as a catalyst and contain an inorganic nucleating agent, 50 to 800 parts by weight of a styrene-based monomer and 0.1 to 0.9 parts by weight of a polymerization initiator relative to 100 parts by weight of the styrene-based monomer into an aqueous suspension containing a dispersant; impregnating the polyethylene-based resin particles with the styrene-based monomer under heating the resulting dispersion at such a temperature that the styrene-based monomer does not substantially polymerize; and performing polymerization of the styrene-based monomer at a temperature of (T+10) to (T+35)° C. where T° C. is a crystallization peak temperature of the polyethylene-based resin particles.

6 Claims, 9 Drawing Sheets

STYRENE-MODIFIED LINEAR LOW-DENSITY POLYETHYLENE-BASED RESIN BEADS, STYRENE-MODIFIED LINEAR LOW-DENSITY POLYETHYLENE-BASED EXPANDABLE RESIN BEADS, PRODUCTION METHOD THEREFOR, PRE-EXPANDED BEADS AND EXPANDED MOLDED ARTICLE

RELATED APPLICATIONS

The present application is a continuation of U.S. patent application Ser. No. 11/659,466, filed Feb. 6, 2007, now abandoned, which is a National Phase application of PCT/JP2005/015152, filed Aug. 19, 2005, which claims priority to Japanese Application No. JP2004-258792, filed Sep. 6, 2004, each of which is hereby incorporated by reference in its entirety.

TECHNICAL FIELD

The present invention relates to styrene-modified linear low-density polyethylene-based resin particles, styrene-modified linear low-density polyethylene-based expandable resin particles, production method therefor, pre-expanded particles and an expanded molded article.

BACKGROUND ART

A polyethylene-based resin foam is generally used as a packing material owing to its high elasticity and excellent oil and impact resistance. The polyethylene-based resin foam, however, has weakness that its stiffness and compressive strength are low. On the other hand, a styrene-based resin foam is excellent in stiffness, but has a weakness that it is brittle.

To overcome such weakness, Japanese Examined Patent Publication No. SHO 51(1976)-46138 (Patent Document 1), Japanese Examined Patent Publication No. SHO 52(1977)-10150 (Patent Document 2), Japanese Examined Patent Publication No. SHO 58(1983)-53003 (Patent Document 3) and Japanese Unexamined Patent Publication No. SHO 62(1987)-59642 (Patent Document 4) disclose methods in which polyethylene-based resin is impregnated with a styrene-based monomer and polymerization is performed to obtain styrene-modified polyethylene-based expandable resin particles. The polyethylene-based resins used in these methods are mostly low-density polyethylene, high-density polyethylene, and ethylene/vinyl acetate copolymer. Since the styrene-based monomer cannot be sufficiently dispersed in such polyethylene-based resins, the polyethylene-based resin needs to be crosslinked in order to provide sufficient stiffness and impact resistance.

Japanese Patent No. 2668384 (Patent Document 5) discloses a method for obtaining an expanded molded article of modified polyethylene-based resin excellent in stiffness and impact resistance. In this method, 100 parts by weight of non-crosslinked linear low-density polyethylene-based resin particles, 5 to 300 parts by weight of a vinyl aromatic monomer, and 1 to 3 parts by weight of a polymerization initiator relative to 100 parts by weight of the vinyl aromatic monomer are dispersed in an aqueous medium. Then, the resulting suspension is heated to such a temperature that the monomer does not substantially polymerize to impregnate the inside and the surface of the polyethylene-based resin particles with the monomer. Subsequently, the temperature of the suspension is raised to polymerize the monomer and a vinyl aromatic polymer is micro-dispersed in the polyethylene-based resin to obtain the expanded molded article of modified polyethylene-based resin.

In the above patent, there is no disclosure on linear low-density polyethylene obtained by using a metallocene compound as a catalyst. The non-crosslinked linear low-density polyethylene-based resin particles (ULT-ZEX 3021F manufactured by Mitsui Chemicals, Inc.) described in its Examples are linear low-density polyethylene obtained by polymerization using an ordinary Ziegler-Natta catalyst.

[Patent Document 1] Japanese Examined Patent Publication No. SHO 51(1976)-46138
[Patent Document 2] Japanese Examined Patent Publication No. SHO 52(1977)-10150
[Patent Document 3] Japanese Examined Patent Publication No. SHO 58(1983)-53003
[Patent Document 4] Japanese Unexamined Patent Publication No. SHO 6 (1987)-59642
[Patent Document 5] Japanese Patent No. 2668384

DISCLOSURE OF INVENTION

Problems That the Invention is to Solve

However, an expanded molded article formed with the non-crosslinked linear low-density polyethylene-based resin obtained by using the Ziegler-Natta catalyst employed in the above patent is inadequate for use in, for example, cushioning and auto-parts such as interior furnishings, bumper and the like which need to have impact resistance, and it cannot achieve higher impact resistance.

In the above-mentioned methods, an inorganic nucleating agent is not used in the polyethylene-based resin. In the modified resin particles obtained from such resin, styrene-based resin can be dispersed in particulate form near surface regions of the particles. However, it is difficult to disperse the styrene-based resin in particulate form in center regions of the particles, and the styrene-based resin would be the continuous phase as in the case of Comparative Example 1 described below. Thus, high impact resistance cannot be achieved.

Means of Solving the Problems

According to one aspect, the present invention provides styrene-modified linear low-density polyethylene-based resin particles from which an expanded molded article having extremely high strength is made.

The inventors of the present invention made an extensive study based on their acquaintance that it is necessary to disperse styrene-based resin in particulate form in center regions of the particles. As a result of that, the inventors found that employing linear low-density polyethylene-based resin that has been polymerized using a metallocene compound as a catalyst and adding a styrene-based monomer to particles of this resin, followed by polymerization at a temperature higher than a crystallization peak temperature of these particles by 10° C.-35° C. would allow the styrene-based resin to be dispersed in particulate form not only near the surfaces of the particles but also in the center regions of the particles. The inventors also found that the particles thus obtained can provide styrene-modified linear low-density polyethylene-based resin particles from which the expanded molded article that sufficiently exhibit the impact resistance of polyethylene-based resin and the stiffness of styrene-based resin can be made.

According to one aspect of the present invention, there is provided a method for producing styrene-modified linear low-density polyethylene-based resin particles, comprising the steps of: dispersing 100 parts by weight of non-crosslinked linear low-density polyethylene-based resin particles which are polymerized using a metallocene compound as a catalyst and contain an inorganic nucleating agent, 50 to 800 parts by weight of a styrene-based monomer and 0.1 to 0.9 parts by weight of a polymerization initiator relative to 100 parts by weight of the styrene-based monomer into an aqueous suspension containing a dispersant; impregnating the polyethylene-based resin particles with the styrene-based monomer under heating the resulting dispersion at such a temperature that the styrene-based monomer does not substantially polymerize; and performing polymerization of the styrene-based monomer at a temperature of (T+10) to (T+35)° C. (where T° C. is a crystallization peak temperature of the polyethylene-based resin particles).

According to another aspect of the invention, there is provided a method for producing styrene-modified linear low-density polyethylene-based resin particles, comprising the steps of: dispersing 100 parts by weight of non-crosslinked linear low-density polyethylene-based resin particles which are polymerized using a metallocene compound as a catalyst and contain an inorganic nucleating agent, 30 to 300 parts by weight of a styrene-based monomer and 0.1 to 0.9 parts by weight of a polymerization initiator relative to 100 parts by weight of the styrene-based monomer into an aqueous suspension containing a dispersant; impregnating the polyethylene-based resin particles with the styrene-based monomer under heating the resulting dispersion at such a temperature that the styrene-based monomer does not substantially polymerize; performing first polymerization of the styrene-based monomer at a temperature of (T+10) to (T+35)° C. (where T° C. is a crystallization peak temperature of the polyethylene-based resin particles); and subsequent to the first polymerization, adding a styrene-based monomer and 0.1 to 0.9 parts by weight of a polymerization initiator relative to 100 parts by weight of the styrene-based monomer and adjusting the temperature of the resulting dispersion to (T+10) to (T+35)° C. (where T° C. is a crystallization peak temperature of the polyethylene-based resin particles), so that impregnation of the low-density polyethylene-based resin particles with the styrene-based monomer and second polymerization take place, wherein the total amount of the styrene-based monomers used in the first and second polymerization is 50 to 800 parts by weight relative to 100 parts by weight of the polyethylene-based resin particles.

Furthermore, there is provided a method for producing styrene-modified linear low-density polyethylene-based expandable resin particles, comprising the steps of: dispersing 100 parts by weight of non-crosslinked linear low-density polyethylene-based resin particles which are polymerized using a metallocene compound as a catalyst and contain an inorganic nucleating agent, 50 to 800 parts by weight of a styrene-based monomer and 0.1 to 0.9 parts by weight of a polymerization initiator relative to 100 parts by weight of the styrene-based monomer into an aqueous suspension containing a dispersant; impregnating the polyethylene-based resin particles with the styrene-based monomer under heating the resulting dispersion at such a temperature that the styrene-based monomer does not substantially polymerize; performing polymerization of the styrene-based monomer at a temperature of (T+10) to (T+35)° C. (where T° C. is a crystallization peak temperature of the polyethylene-based resin particles); and impregnating the resin particles during or after the polymerization with a volatile blowing agent.

Still further, there is provided a method for producing styrene-modified linear low-density polyethylene-based expandable resin particles, comprising the steps of: dispersing 100 parts by weight of non-crosslinked linear low-density polyethylene-based resin particles which are polymerized using a metallocene compound as a catalyst and contain an inorganic nucleating agent, 30 to 300 parts by weight of a styrene-based monomer and 0.1 to 0.9 parts by weight of a polymerization initiator relative to 100 parts by weight of the styrene-based monomer into an aqueous suspension containing a dispersant; impregnating the polyethylene-based resin particles with the styrene-based monomer under heating the resulting dispersion at such a temperature that the styrene-based monomer does not substantially polymerize; performing first polymerization of the styrene-based monomer at a temperature of (T+10) to (T+35)° C. (where T° C. is a crystallization peak temperature of the polyethylene-based resin particles); subsequent to the first polymerization, adding a styrene-based monomer and 0.1 to 0.9 parts by weight of a polymerization initiator relative to 100 parts by weight of the styrene-based monomer and adjusting the temperature of the resulting dispersion to (T+10) to (T+35)° C. (where T° C. is a crystallization peak temperature of the polyethylene-based resin particles), so that impregnation of the polyethylene-based resin particles with the styrene-based monomer and second polymerization take place, wherein the total amount of the styrene-based monomers used in the first and second polymerization is 50 to 800 parts by weight relative to 100 parts by weight of the polyethylene-based resin particles; and impregnating the resin particles during or after the polymerization with a volatile blowing agent.

In accordance with the present invention, provided are styrene-modified linear low-density polyethylene-based resin particles, comprising 50 to 800 parts by weight of styrene-based resin relative to 100 parts by weight of non-crosslinked linear low-density polyethylene-based resin which is polymerized using a metallocene compound as a catalyst, wherein the styrene-based resin is dispersed in form of particles in the styrene-modified linear low-density polyethylene-based resin particles, and the particle diameter of the styrene based resin particles is 0.8 μm or smaller in a surface region within at least 5 μm from the surface and a center region within about a 5 μm radius from the center of the styrene-modified linear low-density polyethylene-based resin particles.

In accordance with the present invention, also provided are styrene-modified linear low-density polyethylene-based resin particles, comprising a volatile blowing agent and 50 to 800 parts by weight of styrene-based resin relative to 100 parts by weight of non-crosslinked linear low-density polyethylene-based resin which is polymerized using a metallocene compound as a catalyst, wherein the styrene-based resin is dispersed a form particles in the styrene-modified linear low-density polyethylene-based resin particles, and the particle diameter of the styrene based resin particles is 0.8 μm or smaller in a surface region within at least 5 μm from the surface and a center region within about a 5 μm radius from the center of the styrene-modified linear low-density polyethylene-based resin particles.

Furthermore, the present invention provides pre-expanded particles having a bulk density of 10 to 300 kg/m³ obtained by pre-expanding the above-mentioned styrene-modified linear low-density polyethylene-based expandable resin particles.

Still further, the present invention provides an expanded molded article having a density of 10 to 300 kg/m³ obtained by expansion molding of the above-mentioned pre-expanded particles.

Effect of the Invention

In the present invention, as described above, the step of impregnating the polyethylene-based resin particles, which are polymerized using a metallocene compound as a catalyst and contain an inorganic nucleating agent, with the styrene-based monomer to perform polymerization is carried out at a specific temperature. This allows for production of the modified resin particles in which the styrene-based particles are dispersed in particulate form not only near the surface but also near the center of the modified resin particles. Furthermore, the styrene-modified linear low-density polyethylene-based resin particles and styrene-modified linear low-density polyethylene-based expandable resin particles are excellent in physical properties, particularly in impact resistance. The present invention also has an advantage that the expandable particles generate a smaller amount of polymer powder and have a high styrene-based resin content. Such expandable particles can be provided by impregnating the inside of the polyethylene-based resin particles with the styrene-based monomer to polymerize the styrene-based monomer, and then adding additional styrene-based monomer after the polymerization has proceeded to a certain degree, so that the impregnation and polymerization take place simultaneously at a specific temperature.

BEST MODE FOR CARRYING OUT THE INVENTION

Figure 1:
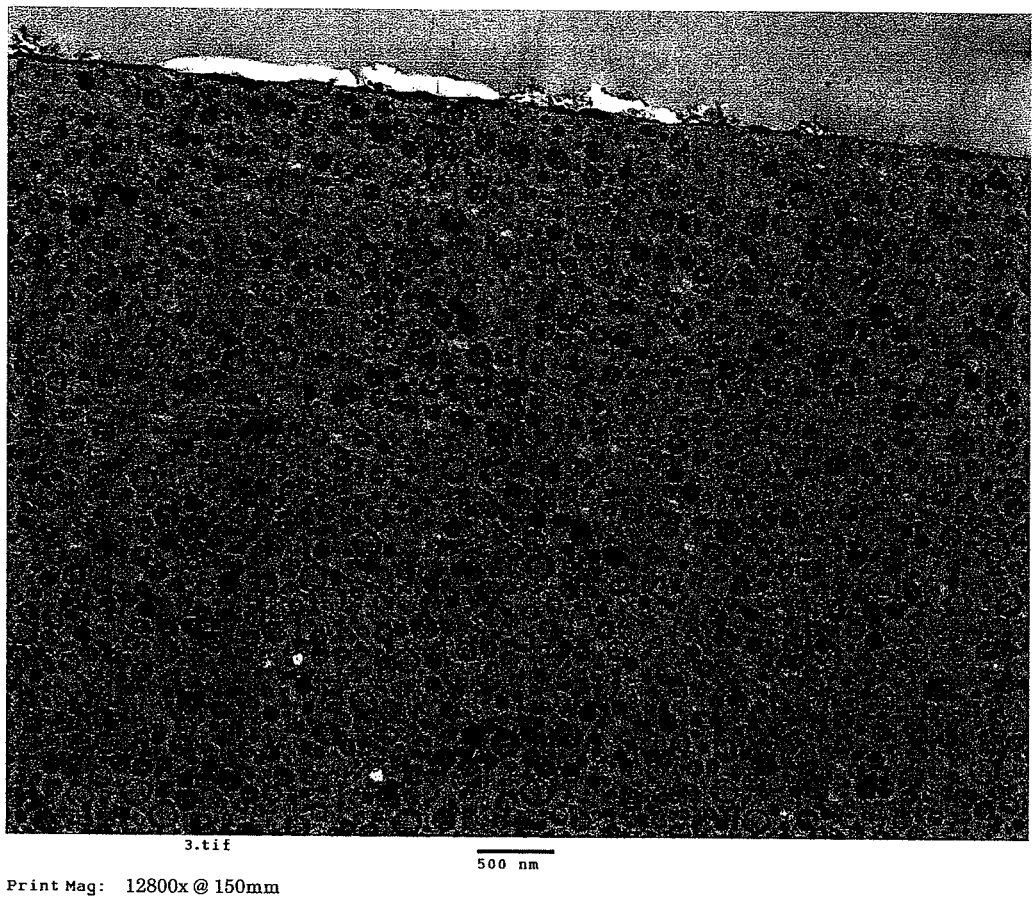
FIG. 1 is a TEM picture showing a surface region cross-section of a modified resin particle according to Example 1 of the present invention.

Styrene-modified linear low-density polyethylene-based resin particles (hereinafter referred to as modified resin particles) obtained by the production method of the present invention are particles made of base resin in which styrene-based resin is dispersed in particulate form. In other words, the modified resin particles are made of base resin in which non-crosslinked linear low-density polyethylene-based resin particles (hereinafter simply referred to as polyethylene-based resin particles) containing an inorganic nucleating agent and being polymerized using a metallocene compound as a catalyst are impregnated with a styrene-based monomer to polymerize the styrene-based monomer. Furthermore, styrene-modified linear low-density polyethylene-based expandable resin particles (hereinafter referred to as expandable particles) are particles in which a volatile blowing agent is contained in the base resin.

The polyethylene-based resin particles used in the present invention are particles containing the inorganic nucleating agent and polyethylene-based resin polymerized using a metallocene compound as a catalyst.

As the metallocene compound, known metallocene compounds which are employed in polymerization of ethylene-based monomers can be used. For example, a metallocene compound having a tetravalent transition metal can be suitably used. More specifically, there can be used cyclopentadienyl titanium tris(dimethylamide), methylcyclopentadienyl titanium tris(dimethylamide), bis(cyclopentadienyl)titanium dichloride, dimethylsilyltetramethylcyclopentadienyl-t-butylamide zirconium dichloride, dimethylsilyltetramethylcyclopentadienyl-t-butylamide hafnium dichloride, dimethylsilyltetramethylcyclopentadienyl-p-n-butylphenylamide zirconium chloride, methylphenylsilyltetramethylcyclopentadienyl-t-butylamide hafnium dichloride, indenyl titanium tris(dimethylamide), indenyl titanium tris(diethylamide), indenyl titanium tris (di-n-propylamide), indenyl titanium bis(di-n-butylamide), indenyl titanium bis(di-n-propylamide) and/or the like. These metallocene compounds having a tetravalent transition metal may be used alone or two or more of these may be used in combination. Alternatively, the metallocene compound may be used together with a cocatalyst such as methylaluminoxane, a boron-based compound or the like.

As the polyethylene-based resin, a homopolymer of ethylene, a copolymer of ethylene and an α-olefin or the like can be used.

As the α-olefin, propylene, 1-butene, 1-pentene, 1-hexene, 3,3-dimethyl-1-butene, 4-methyl-1-pentene, 4,4-dimethyl-1-pentene, 1-heptene, 1-octene and/or the like can be used. Among these, 1-butene and 1-hexene are preferred. These α-olefins may be used alone or two or more of these may be used in combination.

The ratio of ethylene to α-olefin may appropriately vary depending on the desired properties, and preferably is in the range of 1:0.01 to 1:0.1 (in weight). By "low-density", a density in the range of about 0.910 g/ml to 0.925 g/ml is meant.

Polymerization of the polyethylene-based resin is carried out using the metallocene compound as the catalyst. For the ethylene homopolymer, for example, vapor-phase polymerization can be employed and for the ethylene/α-olefin copolymer, for example, solution polymerization using an inert medium, bulk polymerization and vapor-phase polymerization which are substantially free of an inert medium can be employed.

The polyethylene-based resin preferably has a molecular weight distribution (Mw/Mn) of 1.5 to 3.5 measured by GPC (Gel Permeation Chromatography). This range of molecular weight distribution allows for easier molding and an improvement in strength (particularly, in impact resistance) of the resulting molded articles.

As the non-crosslinked linear polyethylene-based resin which is polymerized using the metallocene compound as the catalyst, there can be used the FMRN series manufactured by Nippon Unicar Company Limited, the Evolue F series manufactured by Sumitomo Chemical Co. Ltd., the Evolue series manufactured by Mitsui Chemicals, Inc., the AFFINITY PL series manufactured by Dow Chemical Company or the like.

Together with the above, other polymers and copolymers may be used in such a range that the desired effects of the present invention are not hindered. Specific examples of such polymers and copolymers include low-density polyethylene, high-density polyethylene, an ethylene/propylene copolymer, an ethylene/vinyl acetate copolymer and an ethylene/acrylic acid copolymer having a crosslink and/or a branched chain, and a combination of two or more of these.

As an inorganic nucleating agent, for example, talc, silica, mica, clay, zeolite, calcium carbonate or the like can be used.

The amount of the inorganic nucleating agent used is preferably 0.1 to 2 parts by weight, and more preferably 0.2 to 1.5 parts by weight relative to 100 parts by weight of the polyethylene-based resin particles. An amount less than 0.1 parts by weight is not preferred because it would be difficult to diffuse the styrene-based resin in the polyethylene-based resin so as to make the styrene-based resin be in the form of particles of 0.8 µm or smaller. An amount more than 2 parts by weight is not preferred because the strength of the expanded molded article would tend to decrease.

Furthermore, additives such as a coloring material (colorant), a fire retardant, an antioxidant, an ultraviolet absorber and the like may be contained in the polyethylene-based resin particles upon necessity.

As the coloring material, both inorganic and organic coloring materials can be used. Particularly, inorganic coloring materials such as iron oxide, carbon black and the like are preferred.

As the iron oxide, there can be used α-FeOOH (water-containing crystal) as iron oxide yellow, α-$Fe_2O_3$ as iron oxide red, (FeO)x($Fe_2O_3$)y as iron oxide black or the like. These iron oxides may have another metal such as Zn, Mg or the like substituting for a part of Fe. Furthermore, the iron oxides may be mixed to obtain a desired color. Among the above iron oxides, $Fe_3O_4$ included in iron oxide black, (FeO)x($Fe_2O_3$)y, is preferred.

The iron oxide preferably has an average particle diameter of 0.1 µm to 1 µm, and more preferably an average particle diameter of 0.2 µm to 0.8 µm. The average particle diameter can be measured with a laser diffraction particle size analyzer (RODOS manufactured by JEOL Ltd.)

The polyethylene-based resin particles contain the iron oxide preferably in the range of 1.5 wt % to 70 wt %, more preferably in the range of 5 wt % to 40 wt %, and still more preferably in the range of 10 wt % to 30 wt %. An amount less than 1.5 wt % is not preferred because the polyethylene-based resin particles may not be adequately colored. An amount more than 70 wt % is not preferred because it would be difficult to mix the iron oxide with the polyethylene-based resin particles. Furthermore, because the specific gravity of the iron oxide is greater than that of the polyethylene-based resin, an amount more than 70 wt % would increase the weight of the resin particles and the resin particles would not be uniformly impregnated with the styrene-based monomer.

As the carbon black, furnace black, channel black, thermal black, acetylene black, graphite, carbon fiber or the like can be used.

The polyethylene-based resin particles contain the carbon black preferably in the range of 1 wt % to 50 wt %, and more preferably in the range of 2 wt % to 30 wt %. An amount less than 1 wt % is not preferred because the polyethylene-based resin particles may not be adequately colored. An amount more than 50 wt % is not preferred because it would be difficult to mix the carbon black with the polyethylene-based resin particles.

Examples of the styrene-based resin include those of monomer origin such as styrene, α-methyl styrene, vinyltoluene, chlorostyrene and the like.

The amount of styrene-based resin is 50 to 800 parts by weight, and preferably 100 to 700 parts by weight relative to 100 parts by weight of the polyethylene-based resin. Where the amount of styrene-based resin is less than 50 parts by weight, it is difficult to show the characteristic of the styrene-based resin, namely, high stiffness. Where the amount of styrene-based resin is more than 800 parts by weight, it is difficult to show the characteristics of the polyethylene-based resin, namely, high elasticity and high oil and impact resistance. Furthermore, the styrene-based monomer cannot be sufficiently absorbed into the inside of the polyethylene-based resin, causing polymer powder in which the styrene-based monomer is polymerized by itself to be generated.

In the case of expandable particles, an amount of styrene-based resin less than 50 parts by weight makes the retention of the volatile blowing agent extremely poor, rendering it difficult to achieve low density. This also renders the expansion molding more difficult.

Particularly, with the styrene-based resin in an amount of 300 parts by weight or more, it is difficult to provide modified resin particles and expandable particles uniformly containing the styrene-based resin by conventional methods. The present invention, on the other hand, can provide such resin particles.

As the volatile blowing agent, for example, hydrocarbons such as propane, n-butane, isobutane, pentane, isopentane, cylcopentane, hexane and the like can be used alone or two or more of these hydrocarbons can be used in combination.

The content of the blowing agent is preferably 5 to 20 parts by weight relative to 100 parts by weight of resin that makes up the expandable particles (the sum of the polyethylene-based resin and the styrene-based resin).

Preferably, the modified resin particles and the expandable particles each have a cylindrical, spherical or substantially spherical shape with a L/D (where L is a length of the particle and D is a mean diameter of the particle) of 0.6 to 1.6. The average size of the particles is preferably 0.3 mm to 3.0 mm.

The particles having a L/D smaller than 0.6 or greater than 1.6, that is, the particles having high ovality are not preferred because it would be difficult to fill pre-expanded particles obtained from such modified resin particles and expandable particles into a mold when forming an expanded molded article.

The shape of the particles preferably is spherical or substantially spherical so as to make the filling easier.

An average particle size smaller than 0.3 mm is not preferred because the retention of the blowing agent would decrease and the reduction in density would tend to be difficult. An average particle size greater than 3.0 mm is not preferred because not only the filling into a mold would be difficult, but thinning of an expanded molded article would also be difficult.

According to the present invention, there can be provided the modified resin particles and expandable particles. Each of these particles, when seen in cross-section, has the styrene-based resin dispersed in the form of particles of a predetermined size in the polyethylene-based resin as described below.

In other words, there can be provided the modified resin particles and expandable particles each having the styrene-based resin dispersed in particulate form in the polyethylene-based resin in a surface region and a center region of the particle. The surface region is an area within at least 5 µm from the surface of each particle and the center region is an area within a 5 µm radius from the center of the particle. It is not preferable that the styrene-based resin in particulate form forms the continuous phase and thereby the particle diameter exceeds 0.8 µm as shown in the cross-sectional pictures of the particle center regions of Comparative Examples 1 and 7, because a remarkable improvement in impact resistance would not be achieved. The styrene-based resin is dispersed in the form of particles having a diameter of 0.8 μm or smaller, and preferably 0.6 μm or smaller in the polyethylene-based resin. The lower limit for the particle diameter of the styrene-based resin in particulate form (hereinafter referred to as styrene-based resin particles) is about 0.01 μm. As described above, the styrene-based resin can be dispersed in particulate form in the surface and center regions of each particle.

The diameter of the styrene-based resin particles in the surface region of each particle is preferably 0.01 μm to 0.8 μm, more preferably 0.01 μm to 0.6 μm, and still more preferably 0.03 μm to 0.4 μm. On the other hand, the diameter of the styrene-based resin particles in the center region of each particle is preferably 0.01 μm to 0.8 μm, more preferably 0.01 μm to 0.6 μm, and still more preferably 0.05 μm to 0.55 μm.

Next, a production method of the modified resin particles and expandable particles according to the present invention will be described.

In an aqueous suspension containing a dispersant, 100 parts by weight of polyethylene-based resin particles, 50 to 800 parts by weight of a styrene-based monomer and 0.1 to 0.9 parts by weight of a polymerization initiator relative to 100 parts by weight of the styrene-based monomer are dispersed. Here, the styrene-based monomer and the initiator may be mixed in advance.

As an aqueous medium that makes up the aqueous suspension, there can be used water or a mixed medium of water and a water-soluble solvent (for example, lower alcohol).

The dispersant is not particularly limited, and any of the known dispersants can be used. More specifically, there can be used slightly soluble inorganic substances such as calcium phosphate, magnesium pyrophosphate, sodium pyrophosphate, magnesium oxide and the like. Furthermore, a surface-active agent such as sodium dodecylbenzenesulfonate may be used.

The polyethylene-based resin particles can be obtained by known methods. For example, there is a method in which polyethylene-based resin and an inorganic nucleating agent together with an additive, if necessary, are melted and kneaded in an extruder and then extruded from the extruder to obtain a strand. Then, the obtained strand is cut in the air or in the water or cut while being heated to granulate the strand.

Preferably, the polyethylene-based resin particles each have a cylindrical, spherical or substantially spherical shape with an L/D (where L is a length of the particle and D is a mean diameter of the particle) of 0.6 to 1.6. The average size of the particles is preferably 0.2 mm to 1.5 mm. The particles having a L/D smaller than 0.6 or greater than 1.6, that is, the particles having high ovality are not preferred because it would be difficult to fill pre-expanded particles of expandable particles into a mold when forming an expanded molded article. The shape of the particles is preferably spherical or substantially spherical so as to make the filling easier. An average particle size smaller than 0.2 mm is not preferred because the retention of the blowing agent would decrease and the reduction in density would tend to be difficult. An average particle size greater than 1.5 mm is not preferred because not only the filling into a mold would be difficult, but thinning of an expanded molded article would also be difficult.

As the polymerization initiator, those typically used as a polymerization initiator for suspension polymerization of a styrene-based monomer can be used. Examples thereof include organic peroxides such as di-t-butyl peroxide, t-butyl peroxy benzoate, dicumyl peroxide, 2,5-dimethyl-2,5-di-t-butylperoxy hexane, t-butylperoxy-3,5,5-trimethyl hexanoate, t-butyl-peroxy-2-ethylhexyl carbonate and the like.

These initiators may be used alone or two or more of these may be used in combination.

The amount of the initiator used is preferably 0.1 to 0.9 parts by weight and more preferably 0.2 to 0.5 parts by weight relative to 100 parts by weight of the styrene-based monomer. An amount less than 0.1 parts by weight is not preferred because too much time would be required for the polymerization of the styrene-based monomer. An amount more than 0.9 parts by weight is not preferred because the molecular weight of the styrene-based resin would decrease, and thereby the impact resistance would be reduced.

In order to achieve excellent properties, the molecular weight of the styrene-based resin is preferably about two hundred thousands to about five hundred thousands. However, where more than 0.9 parts by weight of the initiator is used, only a molecular weight smaller than the above-mentioned range can be obtained.

50 to 800 parts by weight of the styrene-based monomer relative to 100 parts by weight of the polyethylene-based resin particles is added and dispersed preferably under stirring, and the resulting dispersion is heated to such a temperature that the styrene-based monomer does not substantially polymerize so that the polyethylene-based resin particles are impregnated with the styrene-based monomer.

The time appropriate for sufficiently impregnating the inside of the polyethylene-based resin particles with the styrene-based monomer is 30 minutes to 3 hours. Where polymerization takes place before the particles are sufficiently impregnated, polymer powder of the styrene-based resin is generated. It is desirable that the generation of polymer powder is prevented. It is advantageous that the temperature at which the monomer does not substantially polymerize is as high as possible to accelerate the impregnation rate, but it needs to be determined with consideration given to the decomposition temperature of the initiator.

Next, polymerization of the styrene-based monomer is carried out at a temperature of $(T+10)°$ C. to $(T+35)°$ C. where $T°$ C. is the crystallization peak temperature of the polyethylene-based resin particles.

A polymerization temperature lower than $(T+10)°$ C. is not preferred because the styrene-based resin would not be dispersed in particulate form near the center regions of modified resin particles and the styrene-based resin would be the continuous phase. Furthermore, a polymerization temperature higher than $(T+35)°$ C. is not preferred because aggregated particles in which particles coalesce would be generated.

With the above steps, the modified resin particles can be obtained. The expandable particles can be obtained by impregnating the modified resin particles during or after the polymerization with the volatile blowing agent. The impregnation can be carried out by per se known methods. For example, the impregnation during the polymerization can be carried out by making polymerization reaction to occur in a closed vessel and injecting the volatile blowing agent into the vessel. The impregnation after the polymerization can be carried out by injecting the volatile blowing agent into a closed vessel.

Thus, the modified resin particles and expandable particles having excellent characteristics can be provided by the above-mentioned methods. However, where the amount of styrene-based monomer exceeds 300 parts by weight relative to 100 parts by weight of the polyethylene-based resin particles, polymer powder of the styrene-based monomer tends to increase in amount.

In other words, when the amount of styrene-based monomer is 50 to 300 parts by weight relative to 100 parts by weight of the polyethylene-based resin, the amount of polymer powder of styrene-based resin is small and the modified resin particles and expandable particles having the most stable, excellent characteristics can be easily provided.

Where the amount of styrene-based monomer exceeds 300 parts by weight, it is preferable that the polyethylene-based resin particles are impregnated with the styrene-based monomer in two separate steps as described below in order to reduce the generation of polymer powder.

In an aqueous suspension containing a dispersant, 100 parts by weight of polyethylene-based resin particles, 30 to 300 parts by weight of a styrene-based monomer and 0.1 to 0.9 parts by weight of a polymerization initiator relative to 100 parts by weight of the styrene-based monomer are dispersed. Here, the styrene-based monomer and the initiator may be mixed in advance.

Then, the resulting dispersion is heated to such a temperature that the styrene-based monomer does not substantially polymerize to impregnate the polyethylene-based resin particles with the styrene-based monomer.

Subsequently, first polymerization of the styrene-based monomer is carried out at a temperature of $(T+10)°$ C. to $(T+35)°$ C. where $T°$ C. is the crystallization peak temperature of the polyethylene-based resin particles.

Next, a styrene-based monomer and 0.1 to 0.9 parts by weight of a polymerization initiator relative to 100 parts by weight of the styrene-based monomer are added to the reaction solution of the first polymerization, and the temperature is adjusted to $(T+10)°$ C. to $(T+35)°$ C. where $T°$ C. is the crystallization peak temperature of the polyethylene-based resin particles, so that impregnation of the low-density polyethylene-based resin particles with the styrene-based monomer and second polymerization take place. The total amount of the styrene-based monomers used in the first and second polymerization is 50 to 800 parts by weight relative to 100 parts by weight of the polyethylene-based resin particles. The styrene-based monomer and the initiator may be mixed in advance.

The second addition of the styrene-based monomer and the initiator may be continuous or intermittent. In order to effectively prevent the generation of polymer powder, it is preferable that the impregnation of the inside of the polyethylene-based resin particles and the polymerization take place at approximately the same time. Because the polymerization is carried out at a relatively high temperature, a too high addition rate is not preferred. If the addition rate is too high, the polymerization would proceed before the impregnation takes place. For example, the addition rate is preferably 30 to 100 parts by weight/hour.

With the above steps, the modified resin particles can be obtained. The expandable particles can be obtained as described above by impregnating the resin particles during or after the polymerization with the volatile blowing agent. The impregnation can be carried out by per se known methods such as the one described in Examples.

The expandable particles can be formed into pre-expanded particles by pre-expanding the expandable particles to a predetermined bulk density (for example, 10 to 300 kg/m$^3$) by known methods. The method of measuring the bulk density will be described in Examples.

Furthermore, an expanded molded article can be provided by filling the pre-expanded particles into a mold, and while heating again to expand the pre-expanded particles, heat fusing the expanded particles.

Steam is suitably used as a medium for heating. The expanded molded article preferably has a density of 10 to 300 kg/m$^3$. A density lower than 10 kg/m$^3$ is not preferred because sufficient strength would not be achieved. A density higher than 300 kg/m$^3$ is not preferred because a reduction in weight cannot be achieved and elasticity, which is one of the characteristics of the polyethylene-based resin expanded molded article, may not be sufficiently exhibited.

The obtained expanded molded article is strong and particularly excellent in impact resistance. Since the molded article is modified with the styrene-based resin, it also has high stiffness.

The expanded molded article according to the present invention can be used for various purposes, and is particularly suitable for use in interior of cars, energy absorbing material inserted inside bumpers, packing material for heavy products, and the like.

Since the present invention employs as polyethylene-based resin the resin using a metallocene compound as a catalyst, it can provide an expanded molded article having a falling ball impact value of 80 cm or greater. Although a molded article having a falling ball impact value of less than 80 cm can be used, the one with a value of 80 cm or greater does not easily suffer from cracking and chipping and can suitably be used particularly for energy absorbing materials. A falling ball impact value of 90 cm or greater is more preferred. A method for measuring the falling ball impact resistance will be described in Examples.

EXAMPLES

The present invention will hereinafter be described by way of Examples thereof. It should be understood that the invention be not limited to these Examples. The measurement methods of various values adopted in Examples and Comparative Examples will also be described below.

[Measurement of Crystallization Peak Temperature of Polyethylene-Based Resin]

The crystallization peak temperature is measured according to JIS K7121 using a differential scanning calorimeter (DSC). More specifically, resin as a measurement sample is set on a measuring vessel of the DSC, and the temperature is raised to 280° C. at a heating rate of 10° C./min. After being kept at 280° C. for 10 min., the resin is left to cool to a room temperature (23° C.) and the crystallization peak temperature is measured while the temperature of the resin is raised again at a heating rate of 10° C./min.

[Measurement of Melt Flow Rate of Polyethylene-Based Resin]

The melt flow rate is measured at 230° C. under a load of 10 kgf according to JIS K7210.

[Measurement of Polyethylene-Based Resin Density]

The density is measured according to JIS K6992-2.

[Measurement of Molecular Weight Distribution: Mw/Mn]

The measurement is carried out using a GPC under the following conditions.

Instrument: GPC instrument Type 150C manufactured by Nihon Waters K.K.
Column: TSK GMH-6 manufactured by TOSOH Corporation
Solvent: ortho-dichlorobenzene (ODCB)
Temperature: 135° C.
Flow rate: 1 ml/min.
Injection concentration: 10 mg/10 ml ODCB (injection amount: 500 µl)

The weight-average molecular weight Mw and the number-average molecular weight Mn are determined by conversion from the calibration curve using standard styrene resin, and then the Mw/Mn is calculated.

[Measurement of Bulk Density]

The measurement is carried out according to a method described in JIS K 6911:1995 "General testing methods for thermosetting plastics". More specifically, pre-expanded particles are allowed to free fall into a graduated cylinder and their weight is measured by an apparent density measuring instrument. The bulk density is determined from the following equation.

bulk density (kg/m$^3$)=weight (kg)/particles volume in graduated cylinder (m$^3$)

[Measurement of Expanded Molded Article Density]

The density of an expanded molded article is measured by a method described in JIS A 9511:1995 "Prefoamed cellular plastics thermal insulation materials".

[Measurement of Impact Strength]

For the measurement of the impact strength, a sample having a size of 215 mm×40 mm×20 mm is cut from the expanded molded article. The sample is then placed on a pair of holding members arranged at a distance of 155 mm. A steel ball weighing 321 g is dropped from a predetermined height on a position at the center of the sample in width direction and at a halfway between the pair of holding members to see whether or not the sample is broken.

This test is repeated from a variety of ball-drop heights and the minimum height that produced a break in the sample is defined as a falling ball impact value. The impact strength is thus evaluated. The impact strength increases as the falling ball impact value increases.

The maximum height from which the ball is dropped is set to 120 cm. Where the falling ball impact value exceeds 120 cm, the weight of the ball is changed to 534 g or 1044 g and the falling ball impact value is measured in the same manner as described above. The obtained value is converted into a falling ball impact value of the ball of 321 g by the following equation.

impact value of 321 g ball+(534/321)×(impact value of 534 g ball)    (1)

impact value of 321 g ball+(1044/321)×(impact value of 1044 g ball)    (2)

In Examples and Comparative Examples, where the falling ball impact value is greater than 120 cm and smaller than 200 cm, values converted by the above equation (1) are shown, and where the falling ball impact value is greater than 200 cm, values converted by the above equation (2) are shown.

Example 1

As a non-crosslinked linear low-density polyethylene-based resin, LLDPE synthesized by using a metallocene catalyst (manufactured by Nippon Unicar Company Limited, tradename: FMRN-063, crystallization peak temperature: 101° C., melt flow rate: 1.3 g/10 min., density: 0.914 g/cm$^3$, molecular weight distribution (Mw/Mn): 2.77) was employed. 100 parts by weight of LLDPE and 0.5 parts by weight of talc were fed into an extruder. The feedstock was melted and kneaded, and then granulated by under water cut system to provide oval (egg-shaped) polyethylene-based resin particles. The average weight of the polyethylene-based resin particles was 0.6 mg.

Next, 0.8 parts by weight of magnesium pyrophosphate (dispersant) and 0.02 parts by weight of sodium dodecylbenzenesulfonate (surface-active agent) were dispersed in 100 parts by weight of water to obtain a medium for dispersion.

In the dispersion medium, 100.5 parts by weight of the polyethylene-based resin particles were dispersed to obtain a suspension.

0.19 parts by weight of dicumyl peroxide as a polymerization initiator was dissolved in advance in 100 parts by weight of a styrene monomer.

The temperature of the dispersion of the polyethylene-based resin particles was adjusted to 60° C. and the styrene-based monomer containing the initiator was added quantitatively to the dispersion over 30 min. Then, the resulting mixture was stirred at 60° C. for an hour to impregnate the polyethylene-based resin particles with the styrene monomer.

Next, the temperature of the dispersion was raised to 130° C. and kept for 2 hours to polymerize the styrene monomer in the polyethylene-based resin particles. Thus, modified resin particles were obtained.

Figure 2:
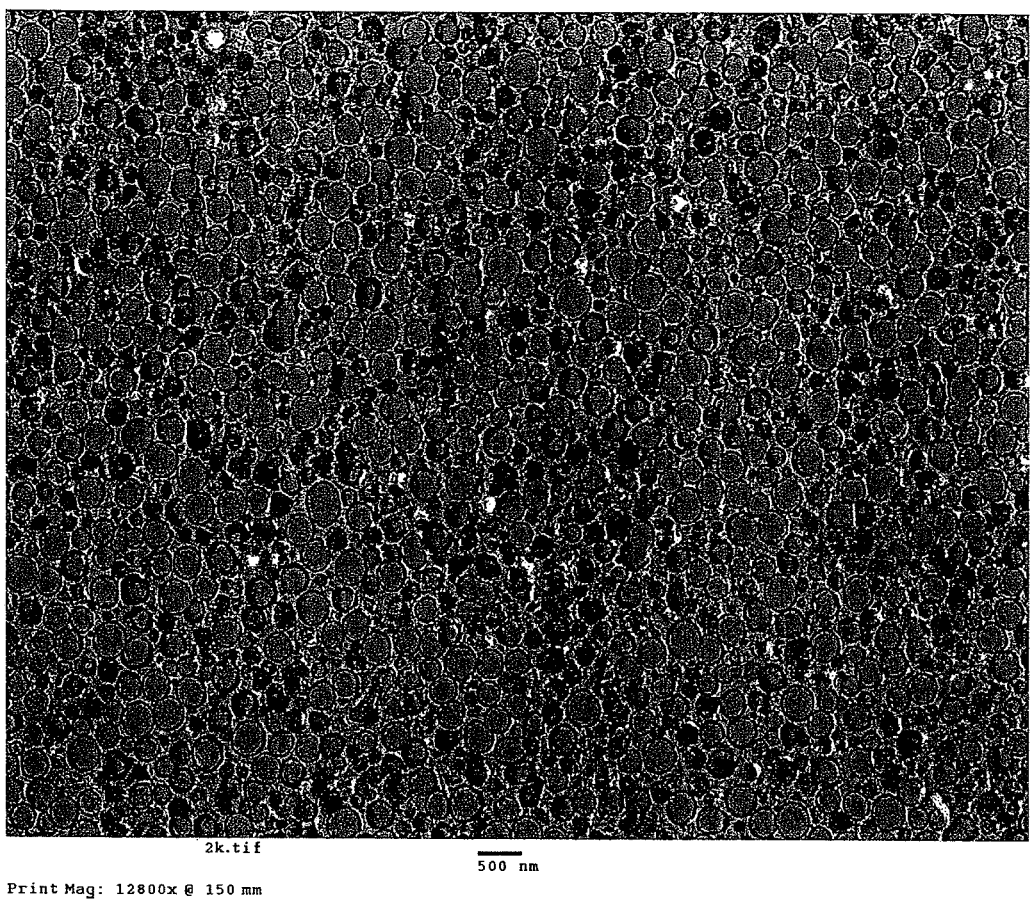
FIG. 2 is a TEM picture showing a center region cross-section of the modified resin particle according to Example 1 of the present invention.

The dispersion state of the styrene resin in the obtained modified resin particles was observed by a TEM (transmission electron microscope). The styrene resin particles with a particle diameter of 0.04 μm to 0.2 μm were dispersed in a surface region (×22,500, an area within about 5 μm from the surface) and the styrene resin particles with a particle diameter of 0.05 μm to 0.5 μm were dispersed in a center region (×12,800, an area within about a 5 μm radius from the center). The cross-sectional pictures of the surface region and the center region are shown in FIG. 1 and FIG. 2, respectively.

Subsequently, 100 parts by weight of the modified resin particles, 0.15 parts by weight of monoglyceride stearate and 0.5 parts by weight of diisobutyl adipate were fed into a pressure-resistant V-type rotary mixer having a volume of 1 m$^3$, and 14 parts by weight of butane (n-butane:i-butane+7:3) as a volatile blowing agent was injected at a normal temperature while the mixer was rotated. After the temperature was raised to 70° C. and kept for 4 hours, it was cooled to 25° C. to obtain expandable particles. The obtained expandable particles had styrene resin particles with a particle diameter of 0.04 μm to 0.2 μm dispersed in a surface region and styrene resin particles with a particle diameter of 0.05 μm to 0.5 μm dispersed in a center region as in the case of the modified resin particles.

The obtained expandable particles were immediately introduced into a pre-expanding machine and steam was introduced at a pressure of 0.02 MPa to pre-expand the particles. Pre-expanded particles having a bulk density of 60 kg/m$^3$ were obtained.

Then, the pre-expanded particles were filled into a mold of a foam molding machine, and then steam was introduced for expansion molding of the pre-expanded particles. A rectangular parallelepiped expanded molded article having a bulk density of 60 kg/m$^3$ and a size of 300 mm×400 mm×50 mm was obtained. The falling ball impact value of the obtained molded article was measured and it was as excellent as 250.5 cm.

Example 2

100.5 parts by weight of polyethylene-based resin particles obtained in the same manner as in Example 1 were dispersed in a dispersion medium obtained in the same manner as in Example 1.

Furthermore, 0.19 parts by weight of dicumyl peroxide as a polymerization initiator was dissolved in advance in 66 parts by weight of a styrene monomer to obtain a first styrene monomer.

The temperature of the dispersion of the polyethylene-based resin particles was adjusted to 60° C. and the first styrene monomer containing the initiator was added quantitatively to the dispersion over 30 min. Then, the resulting mixture was stirred at 60° C. for an hour to impregnate the polyethylene-based resin particles with the first styrene monomer.

Next, the temperature of the dispersion was raised to 130° C. and kept for two hours to polymerize (first polymerization) the first styrene monomer in the polyethylene-based resin particles.

Subsequently, 0.3 parts by weight of dicumyl peroxide as a polymerization initiator was dissolved in 534 parts by weight of a styrene monomer to obtain a second styrene monomer. The second styrene monomer was dropped continuously into the reaction solution of the first polymerization at a rate of 80 parts by weight per hour for 7 hours, so that the second styrene monomer was polymerized (second polymerization) while the polyethylene-based resin particles were impregnated with the monomer to obtain modified resin particles.

Figure 3:
FIG. 3 is a TEM picture showing a surface region cross-section of a modified resin particle according to Example 2 of the present invention.
Figure 4:
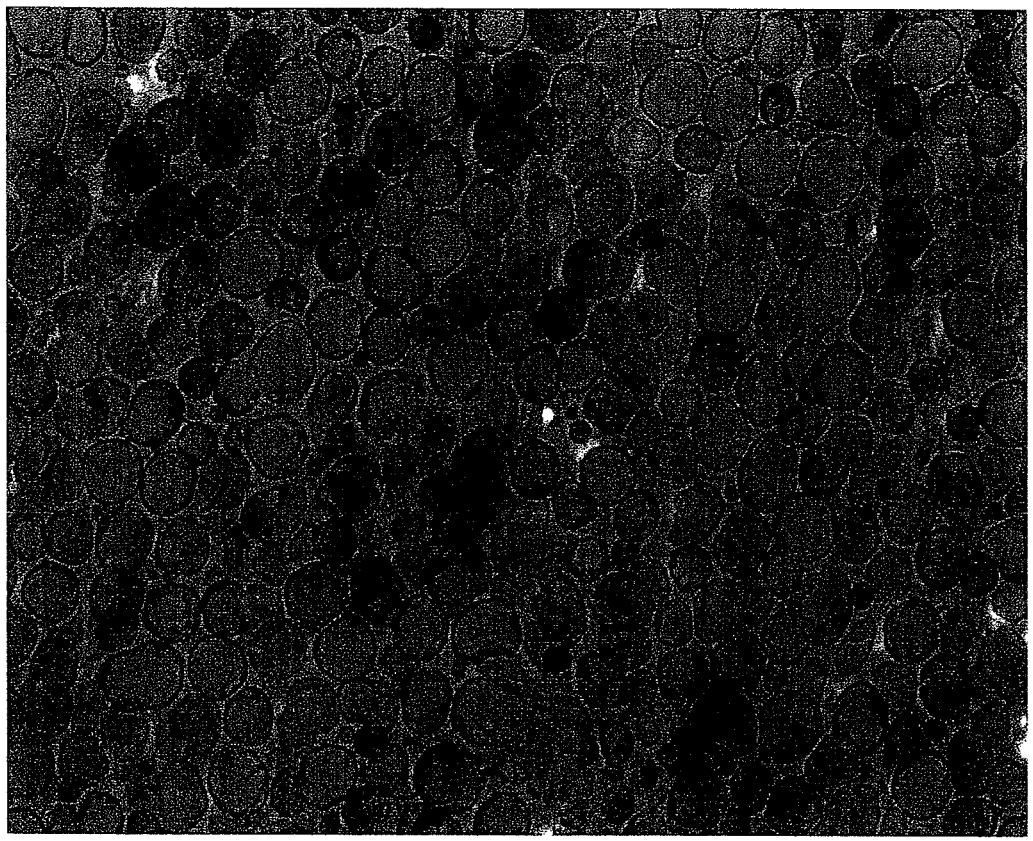
FIG. 4 is a TEM picture showing a center region cross-section of the modified resin particle according to Example 2 of the present invention.

The dispersion state of the styrene resin in the obtained modified resin particles was observed by the TEM (transmission electron microscope). The styrene resin particles with a particle diameter of 0.05 μm to 0.35 μm were dispersed in a surface region (×19,300, an area within about 5 μm from the surface) and the styrene resin particles with a particle diameter of 0.06 μm to 0.4 μm were dispersed in a center region (×38,600, an area within about a 5 μm radius from the center). The cross-sectional pictures of the surface region and the center region are shown in FIG. 3 and FIG. 4, respectively.

Subsequently, expandable particles were prepared in the same manner as in Example 1 except that the amount of blowing agent was changed to 12 parts by weight, 14 parts by weight and 16 parts by weight. The obtained expandable particles had styrene resin particles with a particle diameter of 0.05 μm to 0.35 μm dispersed in a surface region and styrene resin particles with a particle diameter of 0.06 μm to 0.4 μm dispersed in a center region as in the case of the above-mentioned modified resin particles.

An expanded molded article was obtained in the same manner as in Example 1 and the falling ball impact value was measured. The value of the molded article having a density of 60 kg/m³ (the amount of blowing agent: 14 parts by weight) was as excellent as 175.5 cm. Molded articles respectively having a density of 30 kg/m³ (the amount of blowing agent: 16 parts by weight) and 150 kg/m³ (the amount of blowing agent: 12 parts by weight) were prepared and the falling ball impact values were measured. The values of the molded articles were as excellent as 105.5 cm and 260.5 cm, respectively.

Figure 5:
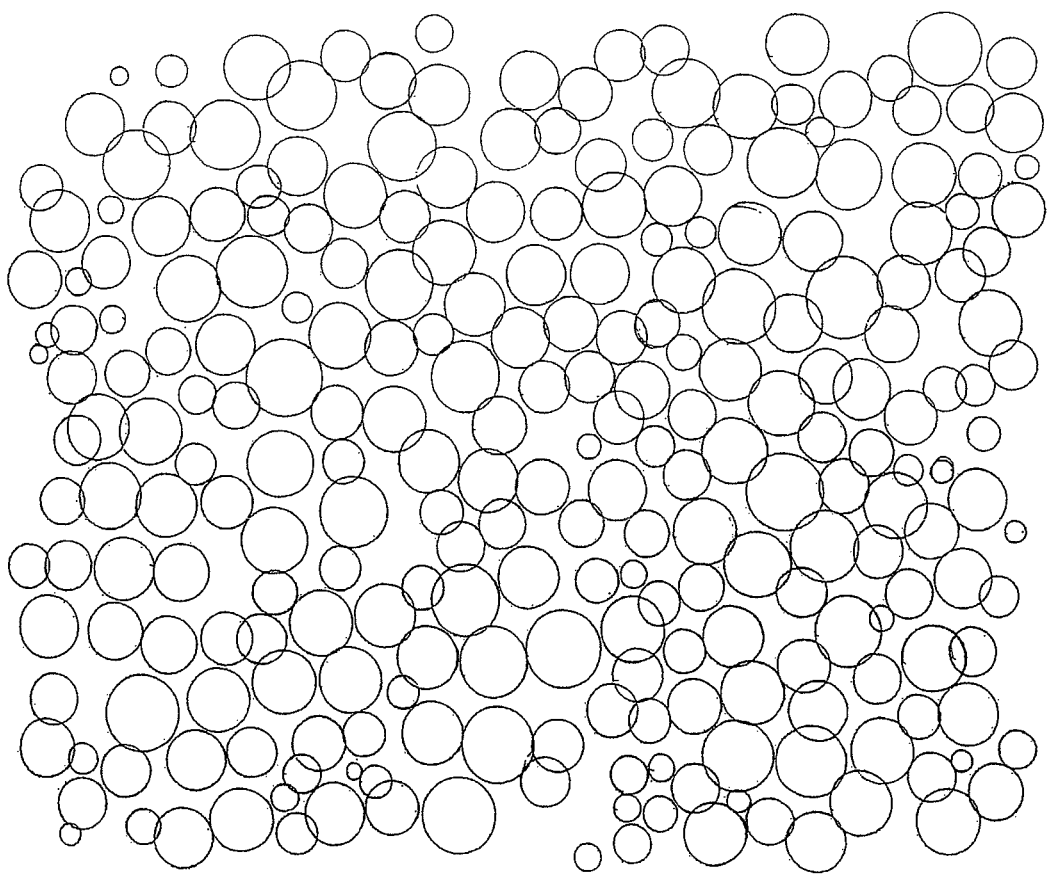
FIG. 5 is a view in which the TEM picture of FIG. 4 is traced.

The diameter of the styrene resin particles in the surface region and the center region were determined as follows. The particles of FIG. 4, for example, were traced as shown in FIG. 5 in such a manner that the areas of the particles of the two figures are substantially equal. The diameter of each particle was measured from the tracing of FIG. 5 and it was confirmed that the particle diameters were in the range of 0.06 μm to 0.4 μm.

Example 3

Modified resin particles were obtained in the same manner as in Example 2 except that "Evolue F-201" manufactured by Sumitomo Chemical Co. Ltd. (melting point: 117° C., crystallization peak temperature: 108° C., melt flow rate: 1.5 g/10 min., density: 0.915 g/cm³, and molecular weight distribution (Mw/Mn): 2.5) was employed as the linear low-density polyethylene-based resin.

The dispersion state of styrene resin in the obtained modified resin particles was observed by the TEM. The styrene resin particles with a particle diameter of 0.05 μm to 0.3 μm were dispersed in a surface region (an area within about 5 μm from the surface) and the styrene resin particles with a particle diameter of 0.1 μm to 0.5 μm were dispersed in a center region (an area within about a 5 μm radius from the center).

Next, expandable particles were obtained in the same manner as in Example 1. In the obtained expandable particles, the styrene resin particles with a particle diameter of 0.05 μm to 0.3 μm were dispersed in a surface region and the styrene resin particles with a particle diameter of 0.1 μm to 0.5 μm were dispersed in a center region as in the case of the above-mentioned modified resin particles.

An expanded molded article was obtained in the same manner as in Example 1, and the falling ball impact value was measured. The value of the molded article having a density of 60 kg/m³ was as excellent as 155.5 cm.

Example 4

Into an extruder, 100 parts by weight of the same linear low-density polyethylene-based resin as that of Example 1, 25 parts by weight of iron oxide particles ($Fe_3O_4$) and 0.5 parts by weight of talc were fed. The feedstock was melted and kneaded, and then granulated by under water cut system to provide oval (egg-shaped) black-colored polyethylene-based resin particles. The average weight of the polyethylene-based resin particles containing iron oxide was 0.7 mg.

Modified resin particles and expandable particles were obtained in the same manner as in Example 2 except that the obtained iron oxide-containing polyethylene-based resin particles were used.

The dispersion states of styrene resin in the obtained modified resin particles and expandable particles were observed by the TEM as in Example 1. The styrene resin particles with a particle diameter of 0.05 μm to 0.3 μm were dispersed in surface regions and the styrene resin particles with a particle diameter of 0.1 μm to 0.45 μm were dispersed in center regions.

Next, expansion molding was carried out in the same manner as in Example 1 to obtain a molded article having a density of 60 kg/m³. The measured falling ball impact value of this foam was as excellent as 125.5 cm.

Example 5

Oval (egg-shaped) black-colored polyethylene-based resin particles were obtained in the same manner as in Example 4 except that 3 parts by weight of carbon black particles were used instead of the iron oxide particles. The average weight of the carbon black-containing polyethylene-based resin particles was 0.6 mg.

Modified resin particles were obtained in the same manner as in Example 2 except that the obtained carbon black-containing polyethylene-based resin particles were used. Then, expandable particles were obtained in the same manner as in Example 1.

The dispersion states of styrene resin in the obtained modified resin particles and expandable particles were observed by the TEM as in Example 1. The styrene resin particles with a particle diameter of 0.06 μm to 0.3 μm were dispersed in surface regions and the styrene resin particles with a particle diameter of 0.1 μm to 0.55 μm were dispersed in center regions.

Next, expansion molding was carried out in the same manner as in Example 1 to obtain a black molded article having a density of 60 kg/m³. The measured falling ball impact value of this foam was as excellent as 155.5 cm.

Example 6

Modified resin particles and expandable particles were obtained in the same manner as in Example 1 except that the amounts of styrene monomer and α-methylstyrene monomer were 95 parts by weight and 5 parts by weight, respectively.

The dispersion states of styrene resin in the obtained modified resin particles and expandable particles were observed by the TEM. The styrene resin particles with a particle diameter of 0.04 μm to 0.2 μm were dispersed in surface regions (areas within about 5 μm from the surfaces) and the styrene resin particles with a particle diameter of 0.05 μm to 0.5 μm were dispersed in center regions (areas within about a 5 μm radius from the centers).

Next, an expanded molded article was obtained in the same manner as in Example 1, and the falling ball impact value was measured. The value of the molded article having a density of 60 kg/m$^3$ was as excellent as 245.5 cm.

Example 7

Modified resin particles were obtained in the same manner as in Example 2 except that the amounts of the first and second styrene monomers were 50 parts by weight and 350 parts by weight, respectively, t-butylperoxybenzoate was used as the polymerization initiator and the polymerization temperature was 115° C. Then, expandable particles were obtained in the same manner as in Example 1 using 14 parts by weight and 16 parts by weight of the blowing agent, respectively.

The dispersion states of styrene resin in the obtained modified resin particles and expandable particles were observed by the TEM. The styrene resin particles with a particle diameter of 0.05 μm to 0.4 μm were dispersed in surface regions (areas within about 5 μm from the surfaces) and the styrene resin particles with a particle diameter of 0.1 μm to 0.5 μm were dispersed in center regions (areas within about a 5 μm radius from the centers).

Next, an expanded molded article was obtained in the same manner as in Example 1, and the falling ball impact value was measured. The value of the molded article having a density of 60 kg/m$^3$ (amount of blowing agent: 14 parts by weight) was as excellent as 155.5 cm. Furthermore, an molded article having a density of 30 kg/m$^3$ (amount of blowing agent: 16 parts by weight) was prepared in the same manner as in Example 1. The falling ball impact value measured of this molded article was as excellent as 120.5 cm.

Example 8

Modified resin particles were obtained in the same manner as in Example 7 except that the inorganic nucleating agent added was silica, dicumyl peroxide was used as the initiator and the polymerization temperature was 140° C. Then, expandable particles were obtained in the same manner as in Example 1.

The dispersion states of styrene resin in the obtained modified resin particles and expandable particles were observed by the TEM. The styrene resin particles with a particle diameter of 0.03 μm to 0.3 μm were dispersed in surface regions (areas within about 5 μm from the surfaces) and the styrene resin particles with a particle diameter of 0.08 μm to 0.4 μm were dispersed in center regions (areas within about a 5 μm radius from the centers).

Next, an expanded molded article was obtained in the same manner as in Example 1, and the falling ball impact value was measured. The value of the molded article having a density of 60 kg/m$^3$ was as excellent as 160.5 cm.

Example 9

Modified resin particles were obtained in the same manner as in Example 2 except that the amounts of the first styrene-monomer and the second styrene-based monomer were 120 parts by weight and 80 parts by weight, respectively. Then, expandable were obtained in the same manner as in Example 1.

The dispersion states of styrene resin in the obtained modified resin particles and expandable particles were observed by the TEM. The styrene resin particles with a particle diameter of 0.04 μm to 0.3 μm were dispersed in surface regions (areas within about 5 μm from the surfaces) and the styrene resin particles with a particle diameter of 0.05 μm to 0.5 μm were dispersed in center regions (areas within about a 5 μm radius from the centers).

Next, an expanded molded article was obtained in the same manner as in Example 1, and the falling ball impact value was measured. The value of the molded article having a density of 60 kg/m$^3$ was as excellent as 215.5 cm.

Example 10

Modified resin particles were obtained in the same manner as in Example 2 except for the following. 50 parts by weight of a styrene monomer was used, and after (first) polymerization at 135° C. using 0.19 parts by weight of dicumyl peroxide as the initiator, the temperature of the reaction system was lowered to 125° C. 0.30 parts by weight of dicumyl peroxide as a polymerization initiator was dissolved in 350 parts by weight of a styrene monomer to prepare a second styrene monomer. The second styrene-based monomer was continuously dropped into the reaction solution of the first polymerization at a rate of 50 parts by weight per hour so that (second) polymerization of the second styrene monomer took place while the resin particles were impregnated with the second styrene monomer. Then, expandable particles were obtained in the same manner as in example 7.

The dispersion states of styrene resin in the obtained modified resin particles and expandable particles were observed by the TEM. The styrene resin particles with a particle diameter of 0.03 μm to 0.3 μm were dispersed in surface regions (areas within about 5 μm from the surfaces) and the styrene resin particles with a particle diameter of 0.08 μm to 0.4 μm were dispersed in center regions (areas within about a 5 μm radius from the centers).

Next, an expanded molded article was obtained in the same manner as in Example 1, and the falling ball impact value was measured. The value of the molded article having a density of 60 kg/m$^3$ (amount of blowing agent: 14 parts by weight) was as excellent as 155.5 cm. Furthermore, a molded article having a density of 30 kg/m$^3$ (amount of blowing agent: 16 parts by weight) was prepared in the same manner as in Example 1. The falling ball impact value measured of this molded article was as excellent as 120.5 cm.

Example 11

Modified resin particles were obtained in the same manner as in Example 10, and 14 parts by weight of pentane (n-pentane:isopentane+80:20, volume ratio) was added instead of butane as the blowing agent. Then, the temperature inside the rotary mixer was raised to 30° C. and kept for 6 hours. Then, the temperature was cooled to 25° C. to obtain expandable particles.

The dispersion states of styrene resin in the obtained modified resin particles and expandable particles were observed by the TEM. The styrene resin particles with a particle diameter of 0.03 μm to 0.3 μm were dispersed in surface regions (areas within about 5 μm from the surfaces) and the styrene resin particles with a particle diameter of 0.08 μm to 0.4 μm were dispersed in center regions (areas within about a 5 μm radius from the centers).

Next, an expanded molded article was obtained in the same manner as in Example 1, and the falling ball impact value was measured. The value of the molded article having a density of 60 kg/m$^3$ (amount of blowing agent: 14 parts by weight) was as excellent as 155.5 cm. Furthermore, a molded article having a density of 30 kg/m$^3$ (amount of blowing agent: 16 parts by weight) was prepared in the same manner as in Example 1. The falling ball impact value measured of this molded article was as excellent as 120.5 cm.

Comparative Example 1

Modified resin particles and expandable particles were obtained in the same manner as in Example 1 except that trade name "TUF-2032" manufactured by Nippon Unicar Company Limited (crystallization peak temperature: 113° C., melt flow rate: 0.9 g/10 min., density: 0.923 g/cm$^3$, molecular weight distribution (Mw/Mn): 4.5) was used as the linear low-density polyethylene-based resin (LLDPE) prepared by using a Ziegler-Natta catalyst, the polymerization temperature was 119° C. and the amount of styrene monomer added was 185 parts by weight.

Figure 6:
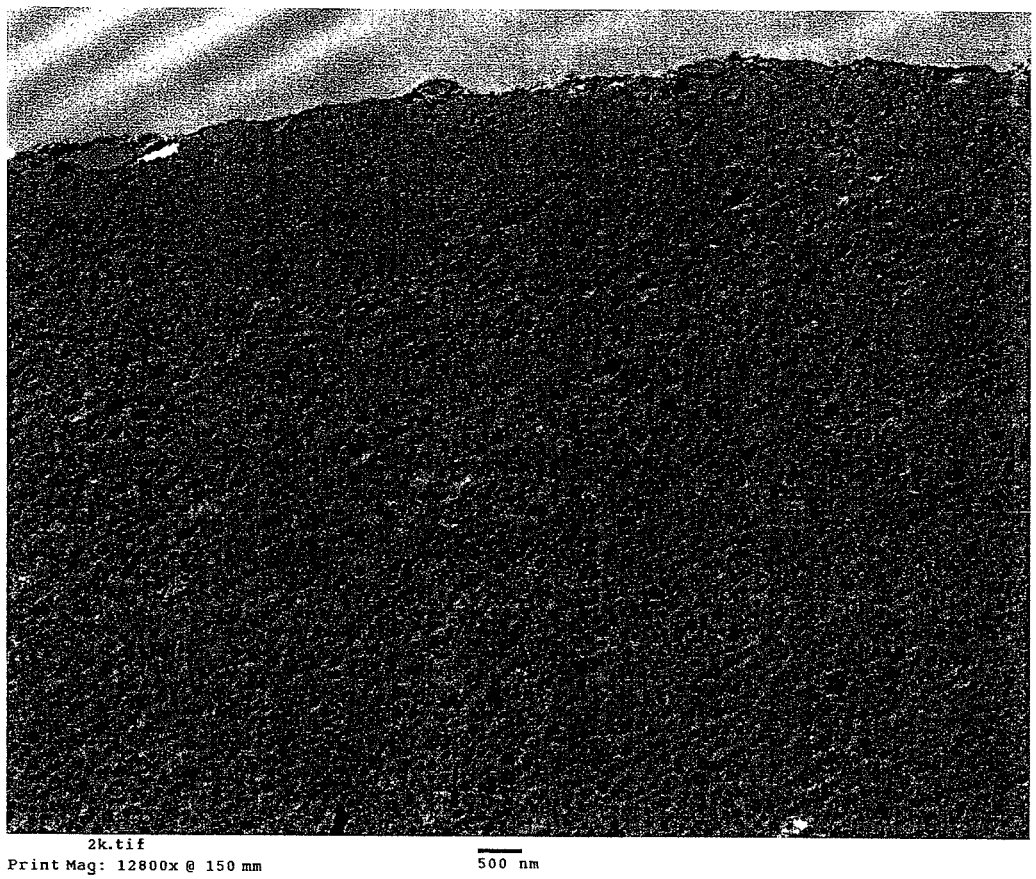
FIG. 6 is a TEM picture showing a surface region cross-section of a modified resin particle according to Comparative Example 1.
Figure 7:
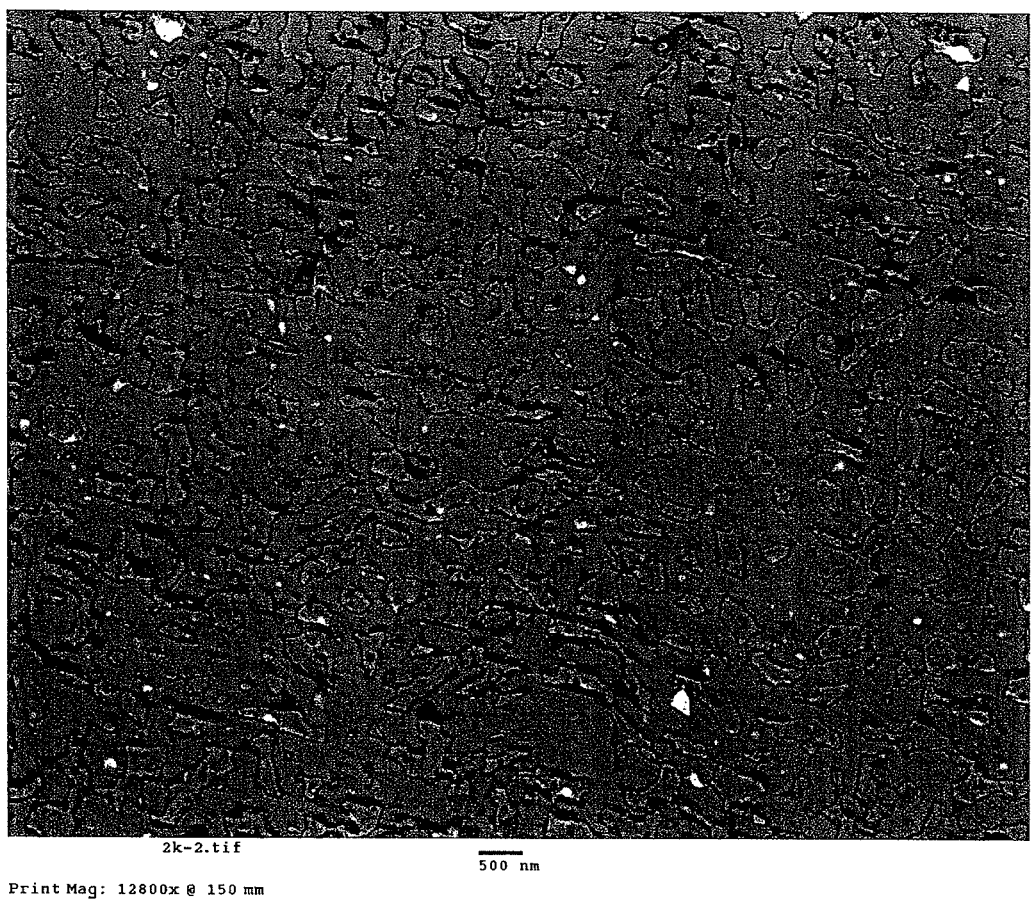
FIG. 7 is a TEM picture showing a center region cross-section of the modified resin particle according to Comparative Example 1.

The dispersion states of styrene resin in the obtained modified resin particles and expandable particles were observed by the TEM. The styrene resin particles with a particle diameter of 0.05 μm to 0.15 μm were dispersed in surface regions (×12,800, areas within about 5 μm from the surfaces), but dispersion of the styrene resin particles was not observed and the styrene resin particles was the continuous phase in center regions (×12,800, areas within about a 5 μm radius from the centers). The cross-sectional pictures of the surface region and center region of the modified resin particles are shown in FIG. 6 and FIG. 7, respectively.

An expanded molded article was made in the same manner as in. Example 1, and the falling ball impact value was measured. The value of the molded article having a bulk density of 60 kg/m$^3$ was 120.5 cm. This is significantly smaller than that of a molded article of the same density which contains polyethylene-based resin obtained using the metallocene compound as a catalyst.

Comparative Example 2

Modified resin particles and expandable particles were obtained in the same manner as in Example 1 except that the amount of styrene-based monomer used was 10 parts by weight.

The dispersion states of styrene resin in the obtained modified resin particles and expandable particles were observed by the TEM. The styrene resin in particulate form was hardly observed in surface regions (areas within about 5 μm from the surfaces) and styrene resin in particulate form was not observed in center regions (areas within about a 5 μm radius from the centers) as well.

Next, the obtained expandable particles were immediately fed to a pre-expanding machine and steam was introduced at a pressure of 0.02 MPa to pre-expand the particles. The particles, however, hardly expanded and pre-expanded particles that can be adapted for expansion molding could not be obtained.

Comparative Example 3

Resin particles were obtained in the same manner as in Example 1 except that the amount of the initiator used was 1.0 parts by weight. The obtained resin particles contained a large amount of fine powder other than the modified resin particles. The fine powder was styrene resin powder and it was generated due to the styrene monomer being polymerized before the impregnation of the inside of the resin particles with the monomer. For this reason, the polyethylene-based resin could not be modified with a desired amount of the styrene resin.

An expanded molded article for the evaluation of physical properties could not be obtained since the fine particles hindered the fusion of the expanded particles at the expansion molding.

Comparative Example 4

Modified resin particles and expandable particles were obtained in the same manner as in Example 1 except that benzoyl peroxide was used as the initiator and the polymerization temperature was 90° C.

The dispersion states of styrene resin in the obtained modified resin particles and expandable particles were observed by the TEM. The styrene resin particles with a particle diameter greater than 1 μm were dispersed in surface regions (areas within 5 μm from the surface). A part of the styrene resin was in a continuous state in center regions (areas within about a 5 μm radius from the centers).

Next, an expanded molded article was obtained in the same manner as in Example 1, and the falling ball impact value was measured. The value of the molded article having a density of 60 kg/m$^3$ was as poor as 95.5 cm.

Comparative Example 5

Modified resin particles were obtained in the same manner as in Example 7 except that benzoyl peroxide was used as the initiator and the polymerization temperature was 90° C. in the first polymerization and dicumyl peroxide was used as the initiator and the polymerization temperature was 130° C. in the second polymerization. Then, expandable particles were obtained in the same manner as in Example 1.

The dispersion states of styrene resin in the obtained modified resin particles and expandable particles were observed by the TEM. The styrene resin particles with a particle diameter greater than 1 μm were dispersed in surface regions (areas within 5 μm from the surfaces) and center regions (areas within about a 5 μm radius from the centers).

Next, an expanded molded article was obtained in the same manner as in Example 1, and the falling ball impact value was measured. The value of the molded article having a density of 60 kg/m$^3$ was as poor as 120.5 cm.

Comparative Example 6

Modified resin particles were obtained in the same manner as in Example 7 except that dicumyl peroxide was used as the initiator and the polymerization temperature was 130° C. in the first polymerization and benzoyl peroxide was used as the initiator and the polymerization temperature was 90° C. in the second polymerization. Then, expandable particles were obtained in the same manner as in Example 1.

The dispersion states of styrene resin in the obtained modified resin particles and expandable particles were observed by the TEM. The styrene resin particles with a particle diameter greater than 1 μm were dispersed in surface regions (areas within 5 μm from the surfaces). The styrene resin was in a continuous state in center regions (areas within about a 5 μm radius from the centers).

Next, an expanded molded article was obtained in the same manner as in Example 1, and the falling ball impact value was measured. The value of the molded article having a density of 60 kg/m³ was as poor as 100.5 cm.

Comparative Example 7

Modified resin particles were obtained in the same manner as in Example 2 except that the amount of the second styrene monomer was 834 parts by weight and it was dropped continuously into the reaction solution of the first polymerization over 10 hours. Then, expandable particles were obtained in the same manner as in Example 1.

Figure 8:
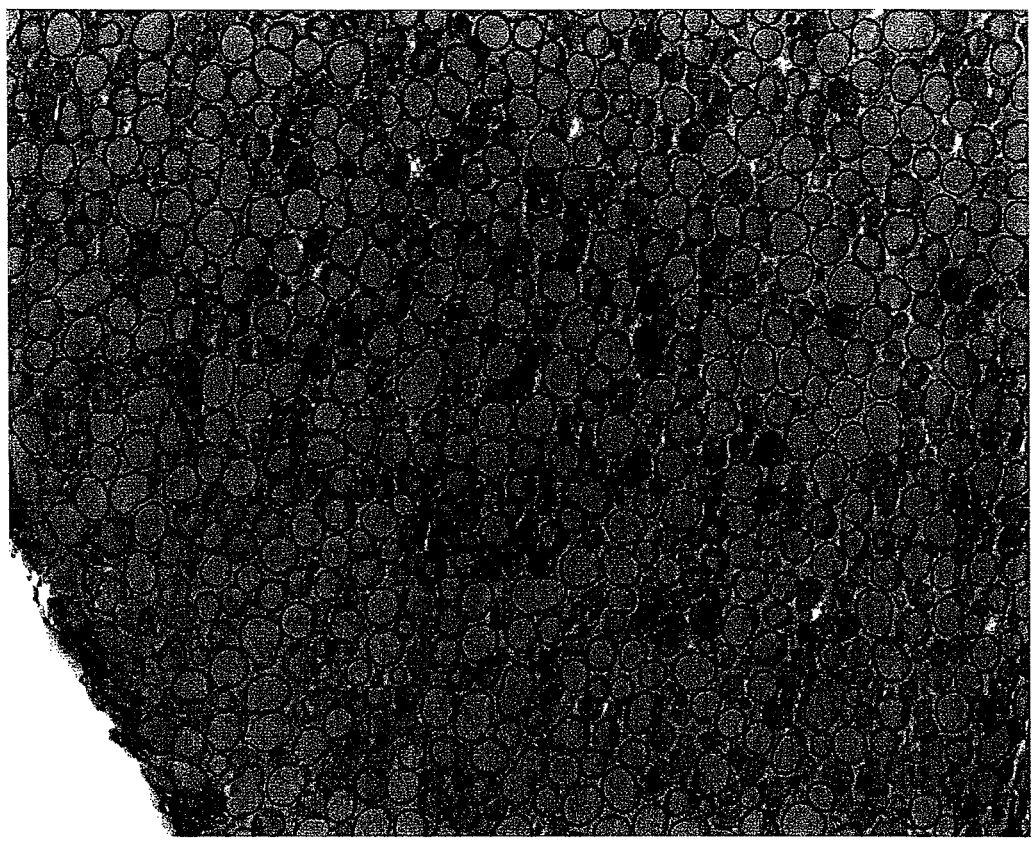
FIG. 8 is a TEM picture showing a surface region cross-section of a modified resin particle according to Comparative Example 7.
Figure 9:
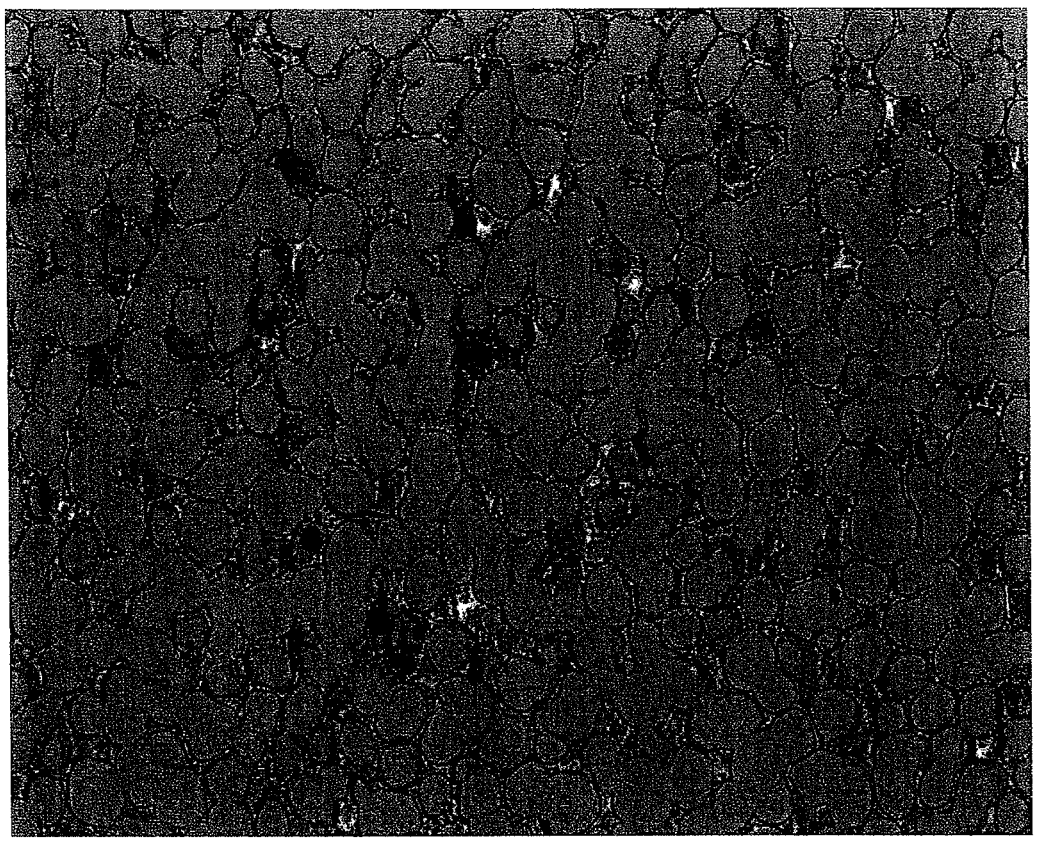
FIG. 9 is a TEM picture showing a center region cross-section of the modified resin particle according to Comparative Example 7.

The dispersion states of styrene resin in the obtained modified resin particles and expandable particles were observed by the TEM. The styrene resin particles with a particle diameter of 0.07 μm to 0.4 μm were dispersed in surface regions (×19,300, areas within about 5 μm from the surfaces), but in center regions (×19,300, areas within about a 5 μm radius from the centers) the particulate styrene resin formed a continuous phase and as a result, the styrene resin particles had a particle diameter greater than 0.8 μm. The cross-sectional pictures of the surface region and the center region are shown in FIG. 8 and FIG. 9, respectively.

Next, an expanded molded article having a density of 60 kg/m³ was made in the same manner as in Example 1, and the falling ball impact value was measured. It was as poor as 120.5 cm.

The conditions for making the modified resin particles, the blowing agent used, the bulk density of the pre-expanded particles and the falling ball impact value of the expanded molded article according to Examples 1-11 and Comparative Examples 1-7 are shown in Table 1 and Table 2.

TABLE 1

| | | Examples | | | | | | |
|---|---|---|---|---|---|---|---|---|
| | | 1 | 2 | 3 | 4 | 5 | 6 | 7 |
| Conditions | PE Resin (pbw) | FMRN-063 100 | FMRN-063 100 | Evolue-F201 100 | FMRN-063 100 | FMRN-063 100 | FMRN-063 100 | FMRN-063 100 |
| | Coloring Agent (pbw) | | | | iron oxide 25 | CB 3 | | |
| | Crz. Peak Temp. (° C.) | 101 | 101 | 108 | 101 | 101 | 101 | 101 |
| | Inorg. Nucleating Agent(pbw) | talc 0.5 | talc 0.5 | talc 0.5 | talc 0.5 | talc 0.5 | talc 0.5 | Talc 0.5 |
| | 1$^{st}$. Styrene-based Monomer (pbw) | SM 100 | SM 66 | SM 66 | SM 66 | SM 66 | SM + α-MSM 95 + 5 | SM 50 |
| | 2$^{nd}$. Styrene-based monomer (pbw) | | SM 534 | SM 534 | SM 534 | SM 534 | | SM 350 |
| | 1$^{st}$. Polym. Temp. (° C.) | 130 | 130 | 130 | 130 | 130 | 130 | 115 |
| | 2$^{nd}$. Polym. Temp. (° C.) | | 130 | 130 | 130 | 130 | | 115 |
| | (1$^{st}$.) Polym. Initiator Amt. (pbw) | 0.19 | 0.19 | 0.19 | 0.19 | 0.19 | 0.19 | 0.19 |
| | (2$^{nd}$.) Polym. Initiator Amt. (pbw) | | 0.30 | 0.30 | 0.30 | 0.30 | | 0.30 |
| Blowing Agent | | butane | butane | butane | butane | butane | butane | butane |
| Bulk Density (kg/cm³) | | 60 | 150 60 30 | 60 | 60 | 60 | 60 | 60 30 |
| Falling Ball Impact Value (cm) | | 250.5 | 260.5 175.5 105.5 | 155.5 | 125.5 | 155.5 | 245.5 | 155.5 120.5 |

| | | Examples | | | |
|---|---|---|---|---|---|
| | | 8 | 9 | 10 | 11 |
| Conditions | PE Resin (pbw) | FMRN-063 100 | FMRN-063 100 | FMRN-063 100 | FMRN-063 100 |
| | Coloring Agent (pbw) | | | | |
| | Crz. Peak Temp. (° C.) | 101 | 101 | 101 | 101 |
| | Inorg. Nucleating Agent(pbw) | silica 0.5 | talc 0.5 | talc 0.5 | talc 0.5 |
| | 1$^{st}$. Styrene-based Monomer (pbw) | SM 50 | SM 120 | SM 50 | SM 50 |
| | 2$^{nd}$. Styrene-based monomer (pbw) | SM 350 | SM 80 | SM 350 | SM 350 |
| | 1$^{st}$. Polym. Temp. (° C.) | 140 | 130 | 135 | 135 |
| | 2$^{nd}$. Polym. Temp. (° C.) | 140 | 130 | 125 | 125 |
| | (1$^{st}$.) Polym. Initiator Amt. (pbw) | 0.19 | 0.19 | 0.19 | 0.19 |
| | (2$^{nd}$.) Polym. Initiator Amt. (pbw) | 0.30 | 0.30 | 0.30 | 0.30 |
| Blowing Agent | | butane | butane | butane | pentane |
| Bulk Density (kg/cm³) | | 60 | 60 | 60 30 | 60 30 |
| Falling Ball Impact Value (cm) | | 160.5 | 215.5 | 155.5 120.5 | 155.5 120.5 | pbw: parts by weight
crz: crystallization

TABLE 2

|  |  | Comparative. Examples | | | | | | |
| --- | --- | --- | --- | --- | --- | --- | --- | --- |
|  |  | 1 | 2 | 3 | 4 | 5 | 6 | 7 |
| Conditions | PE Resin (pbw) | TUF-2032 | FMRN-063 | FMRN-063 | FMRN-063 | FMRN-063 | FMRN-063 | FMRN-063 |
|  |  | 100 | 100 | 100 | 100 | 100 | 100 | 100 |
|  | Crz. Peak Temp. (° C.) | 113 | 101 | 101 | 101 | 101 | 101 | 101 |
|  | Inor. Nucleating Agent (pbw) | talc | Talc | Talc | talc | talc | talc | talc |
|  |  | 0.5 | 0.5 | 0.5 | 0.5 | 0.5 | 0.5 | 0.5 |
|  | 1$^{st}$. Styrene-based monomer (pbw) | SM | SM | SM | SM | SM | SM | SM |
|  |  | 185 | 10 | 100 | 100 | 50 | 50 | 66 |
|  | 2$^{nd}$. Styrene-based monomer (pbw) |  |  |  |  | SM | SM | SM |
|  |  |  |  |  |  | 350 | 350 | 834 |
|  | 1$^{st}$. Polym. Temp. (° C.) | 119 | 130 | 130 | 90 | 90 | 130 | 130 |
|  | 2$^{nd}$. Polym. Temp. (° C.) |  |  |  |  | 130 | 90 | 130 |
|  | (1$^{st}$.) Polym. Initiator (pbw) | 0.19 | 0.19 | 1.0 | 0.19 | 0.19 | 0.19 | 0.19 |
|  | (2$^{nd}$.) Polym. Initiator (pbw) |  |  |  |  | 0.30 | 0.30 | 0.30 |
| Blowing Agent |  | butane | butane | butane | butane | butane | butane | butane |
| Bulk Density(kg/cm$^3$) |  | 60 |  |  | 60 | 60 | 60 | 60 |
| Falling Ball Impact Value (cm) |  | 120.5 |  |  | 95.5 | 120.5 | 100.5 | 120.5 | pbw: parts by weight
crz: crystallization

In Tables 1 and 2, PE refers to polyethylene-based resin, SM refers to a styrene monomer and α-MSM refers to an α-methylstyrene monomer.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

Furthermore, the present invention is related to Japanese Patent Application No. 2004-258792 filed on Sep. 6, 2004, whose priory is claimed and the disclosure of which is incorporated by reference in its entirety.

What is claimed is:

1. A method for producing an auto-part or cushioning part, comprising:

dispersing 100 parts by weight of non-crosslinked linear low-density polyethylene-based resin particles which are polymerized using a metallocene compound as a catalyst and contain an inorganic nucleating agent, 30 to 300 parts by weight of a styrene-based monomer and 0.1 to 0.9 parts by weight of a polymerization initiator relative to 100 parts by weight of the styrene-based monomer into an aqueous suspension containing a dispersant;

impregnating the polyethylene-based resin particles with the styrene-based monomer by heating a resulting dispersion at such a temperature that the styrene-based monomer does not substantially polymerize; performing first polymerization of the styrene-based monomer at a temperature of (T+10) to (T+35)° C., T° C. being a crystallization peak temperature of the polyethylene-based resin particles;

subsequent to the first polymerization, adding a styrene-based monomer and 0.1 to 0.9 parts by weight of a polymerization initiator relative to 100 parts by weight of the styrene-based monomer and adjusting the temperature of the resulting dispersion to (T+10) to (T+35)° C., T° C. being a crystallization peak temperature of the polyethylene-based resin particles, so that impregnation of the polyethylene-based resin particles with the styrene-based monomer and second polymerization take place, wherein the total amount of the styrene-based monomers used in the first and second polymerization is 50 to 800 parts by weight relative to 100 parts by weight of the polyethylene-based resin particles;

impregnating the styrene-modified resin particles with a volatile blowing agent to obtain expandable styrene-modified resin particles;

pre-expanding the expandable styrene-modified resin particles to obtain pre-expanded styrene-modified resin particles; and heating the pre-expanded styrene-modified resin particles in a mold to obtain the auto-part or cushioning part having a falling ball impact value of 80 cm or greater and a density of 10 to 300 kg/m$^3$, and a relationship of the falling ball impact value to the density being such that at a density of 30 kg/m$^3$ the falling ball impact value is 105.5 cm to 120.5 cm, at a density of 60 kg/m$^3$ the falling ball impact value is 125.5 cm to 215.5 cm, and at a density of 150 kg/m$^3$ the falling ball impact value is 260.5 cm.

2. The method for producing an auto-part or cushioning part according to claim 1, wherein the non-crosslinked linear low-density polyethylene-based resin particles have a molecular weight distribution (Mw/Mn) of 1.5 to 3.5 measured by GPC and a density of 0.910 to 0.925 g/m$^3$.

3. The method for producing an auto-part or cushioning part according to claim 1, wherein the styrene-based resin is dispersed in particulate form in the styrene-modified resin particles after the polymerization, and the particle diameter of the styrene-based resin is 0.8 μm or smaller in a surface region at least up to 5 μm from a surface of the styrene-modified resin particles and 0.8 μm or smaller in a center region within a 5 μm radius from a center of the styrene-modified resin particles.

4. The method for producing an auto-part or cushioning part according to claim 1, wherein the styrene-based resin is dispersed in particulate form in the expandable styrene-modified resin particles, and the particle diameter of the styrene-based resin is 0.8 μm or smaller in a surface region at least up to 5 μm from a surface of the expandable styrene-modified resin particles and 0.8 μm or smaller in a center region within a 5 μm radius from a center of the expandable styrene-modified resin particles.

5. An auto-part or cushioning part produced by the method recited in claim 1.

6. The auto-part or cushioning part according to claim 5, wherein the non-crosslinked linear low-density polyethylene-based resin has a molecular weight distribution (Mw/Mn) of 1.5 to 3.5 measured by GPC and a density of 0.910 to 0.925g/cm$^3$.

* * * * *

UNITED STATES PATENT AND TRADEMARK OFFICE
CERTIFICATE OF CORRECTION

PATENT NO. : 8,592,494 B2  
APPLICATION NO. : 13/230568  
DATED : November 26, 2013  
INVENTOR(S) : H. Matsumura et al.

Page 1 of 1

It is certified that error appears in the above-identified patent and that said Letters Patent is hereby corrected as shown below:

In the Claims

At column 23, line 62 (claim 1, line 26) of the printed patent, please change "ofthe" to --of the--.

At column 24, lines 63 and 64 (claim 6, lines 2 and 3) of the printed patent, please change "polyethylcnc" to --polyethylene--.

Signed and Sealed this  
Twelfth Day of August, 2014

Michelle K. Lee  
*Deputy Director of the United States Patent and Trademark Office*